US007535692B2

(12) United States Patent
Krupenkin et al.

(10) Patent No.: US 7,535,692 B2
(45) Date of Patent: May 19, 2009

(54) MULTILEVEL STRUCTURED SURFACES

(75) Inventors: Thomas Nikita Krupenkin, Warren, NJ (US); Joseph Ashley Taylor, Springfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 398 days.

(21) Appl. No.: 11/390,753

(22) Filed: Mar. 28, 2006

(65) Prior Publication Data

US 2007/0237025 A1 Oct. 11, 2007

(51) Int. Cl.
*H02H 3/00* (2006.01)

(52) U.S. Cl. ........................................ 361/225; 361/233

(58) Field of Classification Search ................. 361/233, 361/225

See application file for complete search history.

(56) References Cited

U.S. PATENT DOCUMENTS 6,086,825 A * 7/2000 Sundberg et al. ............ 422/100

* cited by examiner

*Primary Examiner*—Stephen W Jackson

(57) ABSTRACT

An apparatus comprising a substrate having a surface with electrically connected and electrically isolated fluid-support-structures thereon. Each of the fluid-support-structures have at least one dimension of about 1 millimeter or less. The electrically connected fluid-support-structures are taller than the electrically isolated fluid-support-structures.

19 Claims, 7 Drawing Sheets

MULTILEVEL STRUCTURED SURFACES

TECHNICAL FIELD OF THE INVENTION

The present invention is directed, in general, to reversibly controlling the wetability of a surface.

BACKGROUND OF THE INVENTION

It is desirable to reversibly wet or de-wet a surface, because this allows one to reversibly control the mobility of a fluid on a surface. Controlling the mobility of a fluid on a surface is advantageous in microfluidics applications where it is desirable to repeatedly move a fluid to a designated location, immobilize the fluid and remobilize it again. It is also advantageous to control the mobility of a fluid on a surface of a body when moving the body through a fluid. Unfortunately existing surfaces do not provide the desired reversible control of wetting.

For instance, certain surfaces with raised features, such as posts or pins, may provide a superhydrophobic surface. That is, a droplet of liquid on a superhydrophobic surface will appear as a suspended drop having a contact angle of at least about 140 degrees. Applying a voltage between the surface and the droplet can cause the surface to become wetted, as indicated by the suspended drop having a contact angle of less than 90 degrees. This is further discussed in U.S. Patent Applications 2005/0039661 and 2004/0191127, which are incorporated by reference herein in their entirety. Unfortunately, the droplet may not return to its position on top of the structure and with a high contact angle when the voltage is then turned off.

SUMMARY OF THE INVENTION

To address one or more of the above-discussed deficiencies, one embodiment is an apparatus. The apparatus comprises a substrate having a surface with electrically connected and electrically isolated fluid-support-structures thereon. Each of the fluid-support-structures has at least one dimension of about 1 millimeter or less. The electrically connected fluid-support-structures are taller than the electrically isolated fluid-support-structures.

Another embodiment is a method that comprises reversibly moving a fluid locatable on a substrate surface. The fluid is placed on the substrate surface. The surface comprises the above-described electrically connected and electrically isolated fluid-support-structures thereon. A voltage is applied between the fluid and the electrically connected fluid-support-structures thereby causing the fluid to lie on the tops of the electrically isolated fluid-support-structures. The method further comprises removing the voltage, thereby causing the fluid to lie on the tops of the electrically connected fluid-support-structures.

Still another embodiment is a method. The method comprises manufacturing an apparatus by forming a plurality of the above-described electrically isolated fluid-support-structures and electrically connected fluid-support-structures on a surface of a substrate.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

As part of the present invention it is recognized that de-wetting a surface by returning a fluid to the tops of fluid-support-structures can be impeded when the fluid contacts a base layer that the fluid-support-structures are located on. While not limiting the scope of the invention by theory, it is thought that there are energy losses associated with moving the contact line (e.g., the intersection between the fluid, air and base layer) as the fluid spreads over a surface during wetting. These energy losses necessitate the introduction of additional energy to de-wet the surface. Examples of introducing energy to de-wet a surface by heating the surface are presented U.S. patent application Ser. Nos. 11/227,759 and 11/227,808, which are incorporated by reference herein in their entirety.

In contrast, embodiments of the present invention provide an apparatus having a surface with multilevel fluid-support-structures. The multilevel fluid-support-structures facilitate de-wetting with the introduction of less energy than hitherto possible. The multilevel fluid-support-structures are configured to permit a fluid to penetrate between the taller fluid-support-structures but not the shorter fluid-support-structures during wetting. Energy losses associated with moving the contact line during wetting are minimized when the fluid rests on the tops of the shorter fluid-support-structures and does not contact the base layer.

Each fluid-support-structure can be a nanostructure or microstructure. The term nanostructure as used herein refers to a predefined raised feature on a surface that has at least one dimension that is about 1 micron or less. The term microstructure as used herein refers to a predefined raised feature on a surface that has at least one dimension that is about 1 millimeter or less. The term fluid as used herein refers to any liquid that is locatable on the fluid-support-structure. The term de-wetted surface, as used herein, refers to a surface having fluid-support-structures that can support a droplet of fluid thereon such that the droplet has a contact angle of at least about 140 degrees. The term wetted surface, as used herein, refers to a surface having fluid-support-structures that can support a droplet of fluid thereon such that the droplet has a contact angle of about 90 degrees or less.

Figure 1:
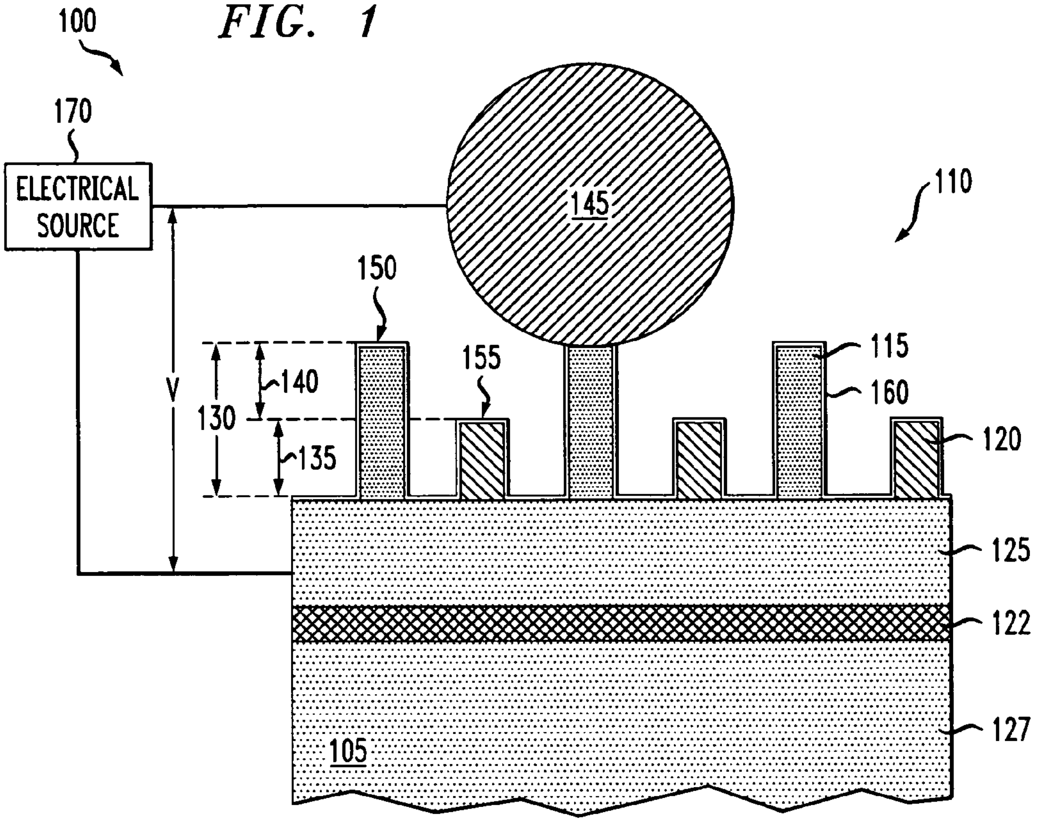
FIG. 1 presents a cross-sectional view of an exemplary apparatus.

FIG. 1 presents a detailed cross-sectional view of an exemplary embodiment of an apparatus 100. The apparatus 100 comprises a substrate 105 having a surface 110 with electrically connected fluid-support-structures 115 and electrically isolated fluid-support-structures 120. The electrically connected fluid-support-structures 115 are taller than the electrically isolated fluid-support-structures 120. Although fluid-support-structures of only two different heights are shown in FIG. 1, it should be understood that the apparatus 100 could have a plurality of electrically connected or isolated fluid-support-structures, each having different heights.

The substrate 105 can comprise a planar semiconductor substrate. In some preferred embodiment, the substrate 105 comprises a silicon-on-insulator (SOI) wafer having an insulating layer 122 of silicon oxide and the upper and lower conductive base layers 125, 127 of silicon. Of course, in other embodiments, the substrate 105 can comprise a plurality of planar layers made of other types of conventional materials.

For the embodiment illustrated in FIG. 1, both of the electrically connected fluid-support-structures 115 and the electrically isolated fluid-support-structures 120 are located on the base layer 125 of the substrate 105. Preferably, the base layer 125 is electrically conductive, thereby facilitating the electrical coupling between the electrically connected fluid-support-structures 115. Both the base layer 125 and the electrically connected fluid-support-structures 115 can be made of an electrically conductive material, such as silicon or doped silicon. The electrically isolated fluid-support-structures 120 can be made of an insulating material such as silicon oxide.

As illustrated in FIG. 1, a height 130 of the electrically connected fluid-support-structures 115 is greater than a height 135 of the electrically isolated fluid-support-structures 120. That is, a difference 140 between a height 130 of the electrically connected fluid-support-structures 115 and a height 135 of the electrically isolated fluid-support-structures 120 is sufficient to prevent a fluid 145 locatable on the electrically connected fluid-support-structures 115 from contacting the electrically isolated fluid-support-structures 120. In some preferred embodiments, the difference in height 140 between the electrically connected and isolated fluid-support-structures 115, 120 is at least about 5 microns. A height difference 140 of at least about 5 microns helps to prevent an e.g., aqueous fluid 145 locatable on the tops 150 of the electrically connected fluid-support-structures 115 from inadvertently contacting the tops 155 of the electrically isolated fluid-support-structures 120, due to movement of the apparatus 100, for example.

It is also preferable for the electrically isolated fluid-support-structures 120 to be sufficiently high to prevent the fluid 145 from inadvertently contacting the base layer 125 during wetting, or due to movement of the apparatus 100. That is, the height 135 of the electrically isolated fluid-support-structures 120 is sufficient to prevent the fluid 145 locatable on the electrically isolated fluid-support-structures 120 from contacting a base layer 125 of the substrate 105. In some embodiments, the height 135 of the electrically isolated fluid-support-structures 115 is at least about 2 microns.

The height 130 of the electrically connected fluid-support-structures 115 is preferably at least about 4 microns, and more preferably at least about 7 microns. There can be an upper bound on the heights 130, 135 of fluid-support-structures 115, 120 set by considerations such as the mechanical stability of the apparatus 100 or limitations in the fabrication process. In some cases, for example, the height 130 of the electrically connected fluid-support-structures 115 ranges from about 5 to 100 microns, and in other cases from about 7 to 20 microns. In some instances, the height 135 of the electrically isolated fluid-support-structures 120 ranges from about from about 1 to 100 microns, and in other instances, from about 2 to 15 microns.

It is advantageous for the total area of the tops 155 of the electrically isolated fluid support structures 120 on the surface 110 to be substantially less (e.g., 10 percent or less and more preferably 1 percent or less) than the total area of the base layer 125 on the surface 110. A lower total surface area helps avoid the same magnitude of energy losses that could occur if the fluid 145 were to contact the base layer 125.

As further illustrated in FIG. 1, the electrically connected fluid-support-structures 115 and the base layer 125 can have a coating 160 that comprises an electrical insulator. For example, when the fluid-support-structures 115 and base layer 125 both comprise silicon, the coating 160 can comprise an electrical insulator of silicon oxide. In such embodiments, the coating 160 prevents current flowing through the base layer 125 or the fluid-support-structures 115 when a voltage (V) is applied between the fluid-support-structures 115 and the fluid 145. It is important to control the thickness of the electrical insulator as it affects the applied voltage. As an example, the coating 160 can comprise an electrical insulator of silicon dioxide layer having a thickness of about 50 nanometers. Of course, as shown in FIG. 1, the electrically insulated fluid-support-structures 120 can also have the coating 160.

In other preferred embodiments, it is desirable for the coating 160 to also comprise a low surface energy material. The low surface energy material facilitates obtaining a high contact angle when the fluid 145 is on the fluid-support-structures 115, when no voltage (V) is applied between the fluid 145 and fluid-support-structures 115. The term low surface energy material, as used herein, refers to a material having a surface energy of about 22 dyne/cm (about $22\times10^{-5}$ N/cm) or less. Those of ordinary skill in the art would be familiar with the methods to measure the surface energy of materials.

In some instances, the coating 160 can comprise a single material, such as Cytop® (Asahi Glass Company, Limited Corp. Tokyo, Japan), a fluoropolymer that is both an electrical insulator and low surface energy material. In other cases, the coating 160 can comprise separate layers of insulating material and low surface energy material. For example, the coating 160 can comprise a layer of a dielectric material, such as silicon oxide, and a layer of a low-surface-energy material, such as a fluorinated polymer like polytetrafluoroethylene.

In some cases it is desirable for the individual ones of the fluid-support-structures 115, 120 to be laterally separated from adjacent fluid-support-structures 115, 120 of the same type. This is further illustrated in FIG. 2 which shows a plan view of the apparatus 100 depicted in FIG. 1. The view depicted in FIG. 1 corresponds to view line 1-1 shown in FIG. 2. The same reference numbers are used to depict similar structures in FIG. 2 as presented above in context of FIG. 1. It should be noted that the apparatus 100 is shown without the coating 160 (FIG. 1) so that underlying structures can be clearly discerned.

It is important for the fluid-support-structures 115, 120 of the same type not to be too far apart. The fluid 145 may not be supported on the electrically connected fluid-support-structures 115 if these types of structures are too far apart. Similarly, the fluid 145 may not be supported on the electrically isolated fluid-support-structures 120, and contact the base layer 125, if these type structures are too far apart.

In some preferred embodiments, the lateral separation 205 between adjacent ones of the electrically connected fluid-support-structures 115 ranges from about 1 to about 20 microns, and in other cases, from about 3 to 5 microns. In some cases, the lateral separation 210 between adjacent ones of the electrically isolated fluid-support-structures 120 ranges from about 1 to 20 microns. In some preferred embodiments, the lateral separation 210 between adjacent ones of the electrically isolated fluid-support-structures 120 is less than about 3 microns, and more preferably less than 2 microns.

In other preferred embodiments of the apparatus 100, a density of the electrically isolated fluid-support-structures 120 within at least one region 220 of the surface 110 is greater than a density of the electrically connected fluid-support-structures 115 in the same region 220. In some cases, the density of the electrically isolated fluid-support-structures 120 ranges from about 1 to about 100 times greater than the density of the electrically connected fluid-support-structures 115.

Consider, for example, the surface 110 comprises a square region 220 that comprises a 50 by 50 micron area of the substrate's surface 110. Assume that an average separation 205 between the adjacent electrically connected fluid-support-structures 115 is about 5 to 10 microns. Further assume that a width 230 of each of these fluid-support-structures 115 is about 300 nanometers. Assume further that an average separation 210 between the adjacent electrically isolated fluid-support-structures 120 is about 2 to 3 microns, and a width 235 of each of these fluid-support-structures 120 is about 300 nanometers. The density of the electrically connected fluid-support-structures 115 in the region 220 can range from about 0.04 to 0.01 posts per square micron (post/$\mu m^2$). The density of the electrically isolated fluid-support-structures 120 in the region 220 can range from about 0.25 to 0.1 posts per square micron. In this example, the density of the electrically isolated fluid-support-structures 120 can range from 2.5 to about 25 times greater than the density of the electrically connected fluid-support-structures 115.

Figure 2:
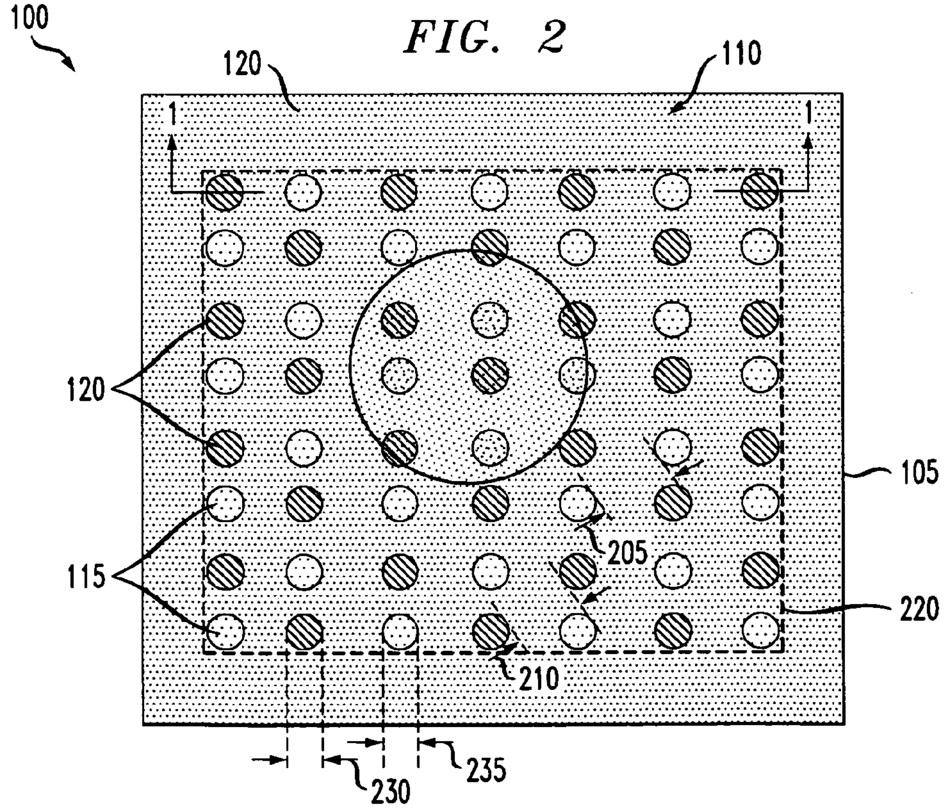
FIG. 2 shows a plan view of the exemplary apparatus depicted in FIG. 1.

As illustrated in FIG. 2, an alternating grid of electrically connected fluid-support-structures 115 and electrically isolated fluid-support-structures 120 can be formed on the surface 110. The locations of the electrically connected fluid-support-structures 115 and electrically isolated fluid-support-structures 120, however, can be independent of each other, with the exception that they cannot occupy the same physical space. For example, the electrically connected fluid-support-structures 115 and electrically isolated fluid-support-structures 120 can independently have ordered or random distributions on the substrate surface 110. The electrically isolated fluid-support-structures 120 can be interspersed between the electrically connected fluid-support-structures 115 in a uniform or non-uniform manner, for example.

Returning now to FIG. 1, some preferred embodiments of the apparatus 100 also comprise an electrical source 170 that is electrically coupled to the electrically connected fluid-support-structures 115. As illustrated in FIG. 1, electrical coupling can be through the base layer 125. The electrical source 170 is configured to apply a voltage (V) between the electrically connected fluid-support-structures 115 and the fluid 145 locatable on the fluid-support-structures 115. In some cases, the electrical source 170 is configured to apply a voltage ranging from about 1 to about 100 Volts.

Each of the fluid-support-structures 115, 120 can comprise a post. The term post, as used herein, includes any structures having round, square, rectangular or other cross-sectional shapes. For example, the fluid-support-structures 115, 120 depicted in FIGS. 1-2 are post-shaped, and more specifically, cylindrically-shaped posts. In this instance, the at least one dimension of about 1 millimeter or less is the lateral thickness or width 230, 235 of the fluid-support-structures 115, 120. In some embodiments, the lateral thicknesses 230, 235 are about 1 micron or less. In some preferred embodiments, the lateral thicknesses 230, 235 range from about 0.2 to about 0.4 microns.

Figure 3:
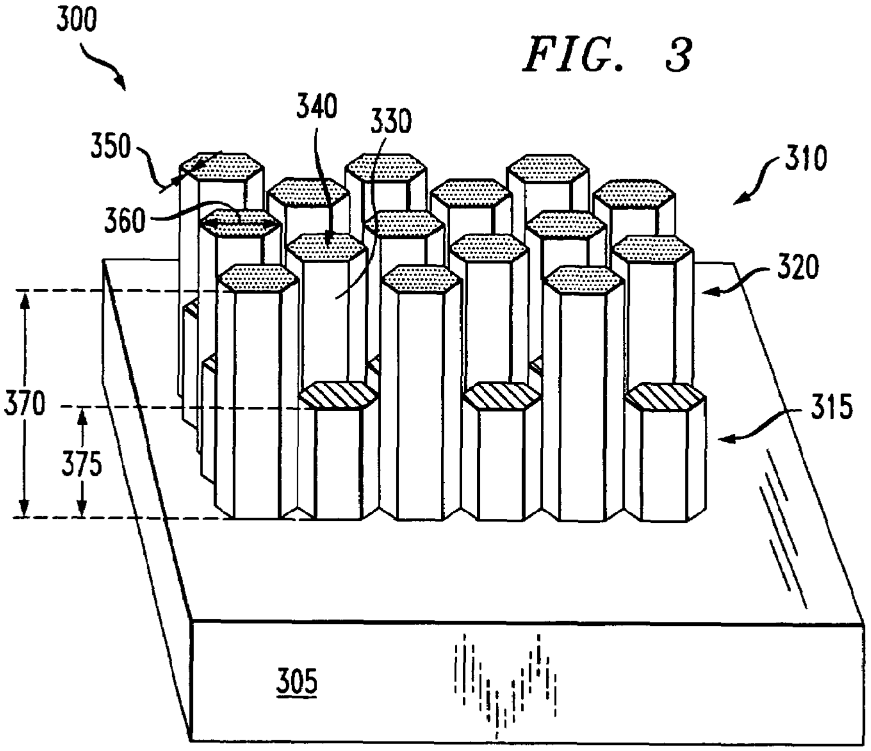
FIG. 3 presents a semi-transparent perspective view of another exemplary apparatus.

In other cases, the fluid-support-structures are cells that are laterally connected to each other. For example, FIG. 3 presents a semi-transparent perspective view of another exemplary apparatus 300. The apparatus has a substrate 305 with a surface 310 that comprises cell-shaped electrically connected fluid-support-structures 315 and cell-shaped electrically isolated fluid-support-structures 320. Similar to that discussed above, the electrically connected fluid-support-structures 315 are taller than the electrically isolated fluid-support-structures 320.

The term cell as used herein refers to a fluid-support-structure having walls 330 that enclose an open area 340 on all sides except for the side over which a fluid could be disposed. In such embodiments, the one dimension that is about 1 micrometer or less is a lateral thickness 350 of the walls 330 of the cell-shaped fluid-support-structure 315, 320. A maximum lateral width 360 of each cell-shaped fluid-support-structure 315, 320 can range from about 10 microns to about 1 millimeter. In certain preferred embodiments, the maximum lateral width 360 about 15 microns or less.

The height 370 of the electrically connected fluid-support-structures 315 can be the same as described for the electrically connected fluid-support-structures 115 shown in FIG. 1. Similarly, the height 375 of the electrically isolated fluid-support-structures 320 can be the same as described above for electrically isolated fluid-support-structures 120 such as shown in FIG. 1. Heights 370, 375 ranging from about 2 microns to about 20 microns are preferred in some embodiments because walls 330 having such dimensions are then less prone to undercutting during their fabrication.

For the embodiment shown in FIG. 3, each the fluid-support-structures 315, 320 has an open area 340 that prescribes a hexagonal shape in the lateral dimensions of the figure. However in other embodiments, the open area 340 can be prescribed by circular, square, octagonal or other shapes. It is not necessary for each of the fluid-support-structures 315, 320 to have shapes and dimensions that are identical to each other, although this is preferred in some embodiments of the apparatus 300.

As also illustrated in FIG. 3, the fluid-support-structures 315, 320 can be laterally connected to each other because each fluid-support-structure 315, 320 shares at least one wall 330 with an adjacent fluid-support-structure. As shown in FIG. 3, individual electrically isolated fluid-support-structures 320 can alternate between the individual electrically connected fluid-support-structures 315. Thus, in some cases, the electrically isolated fluid-support-structures 320 are laterally connected only to adjacent electrically connected fluid-support-structures 315. However, in other cases, at least some of the electrically isolated fluid-support-structures 320 are laterally connected to adjacent isolated fluid-support-structures 320. Similarly, there are embodiments where at least some of the electrically connected fluid-support-structures 315 are laterally connected to adjacent electrically connected fluid-support-structures 315.

Additionally, the apparatus 300 can also comprise fluid-support-structures that comprise closed-cells having internal walls that divide an interior of each of the closed-cells into a single first zone and a plurality of second zones, as described as described in U.S. patent application Ser. No. 11/227,663, which is also incorporated by reference in it entirety.

Figure 4:
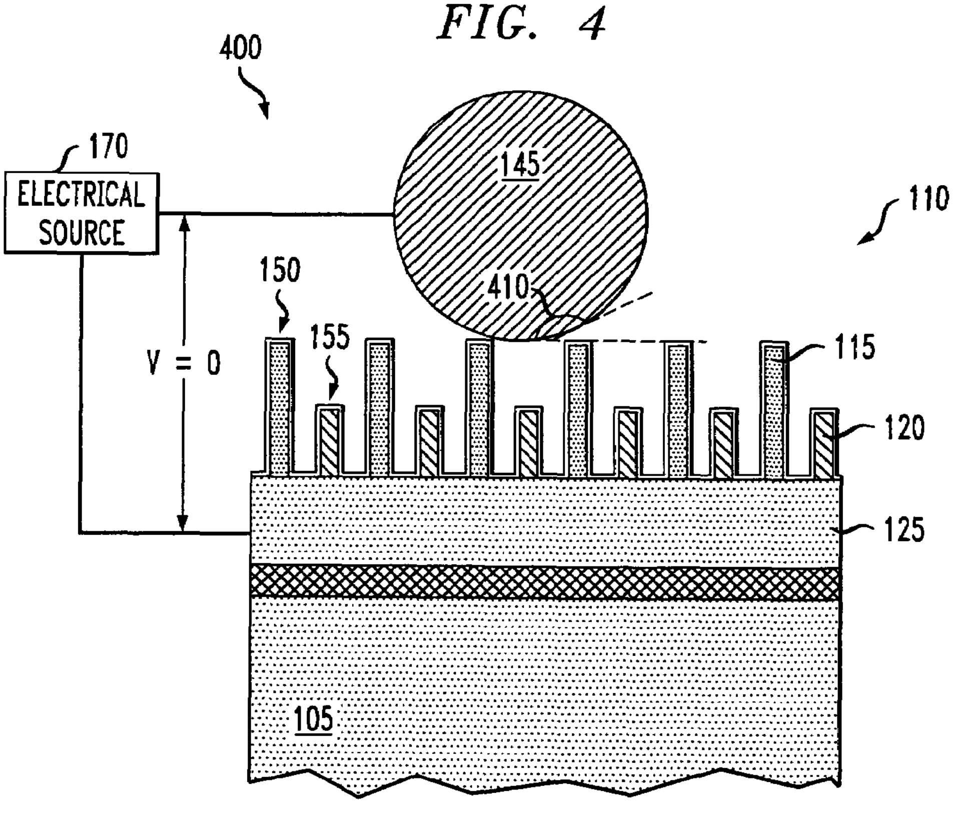
FIGS. 4-6 present cross-sectional views of an exemplary apparatus at various stages in a method of use.
Figure 5:
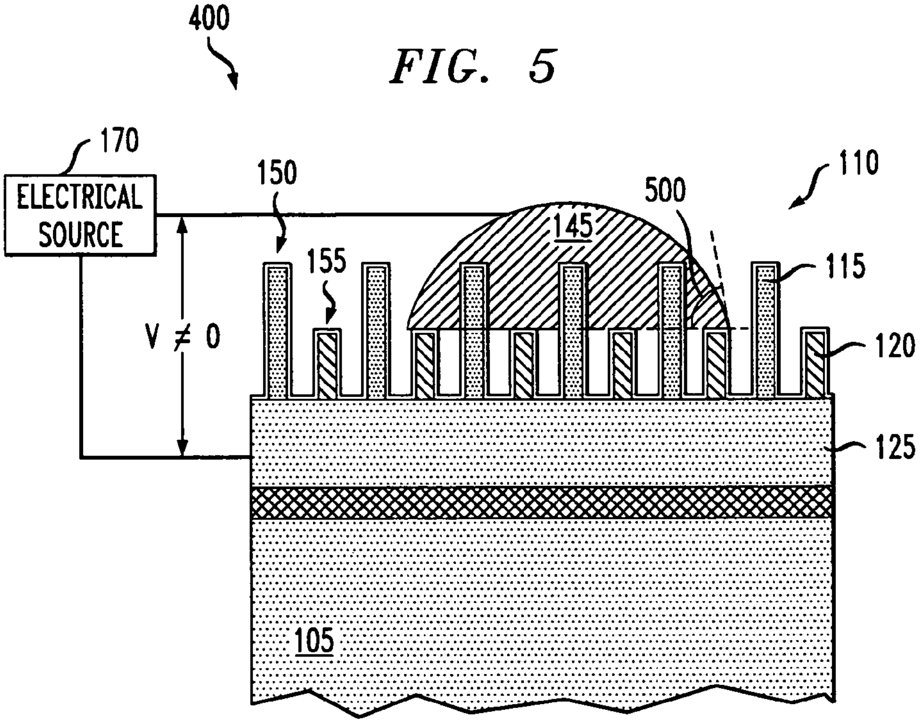
Figure 6:
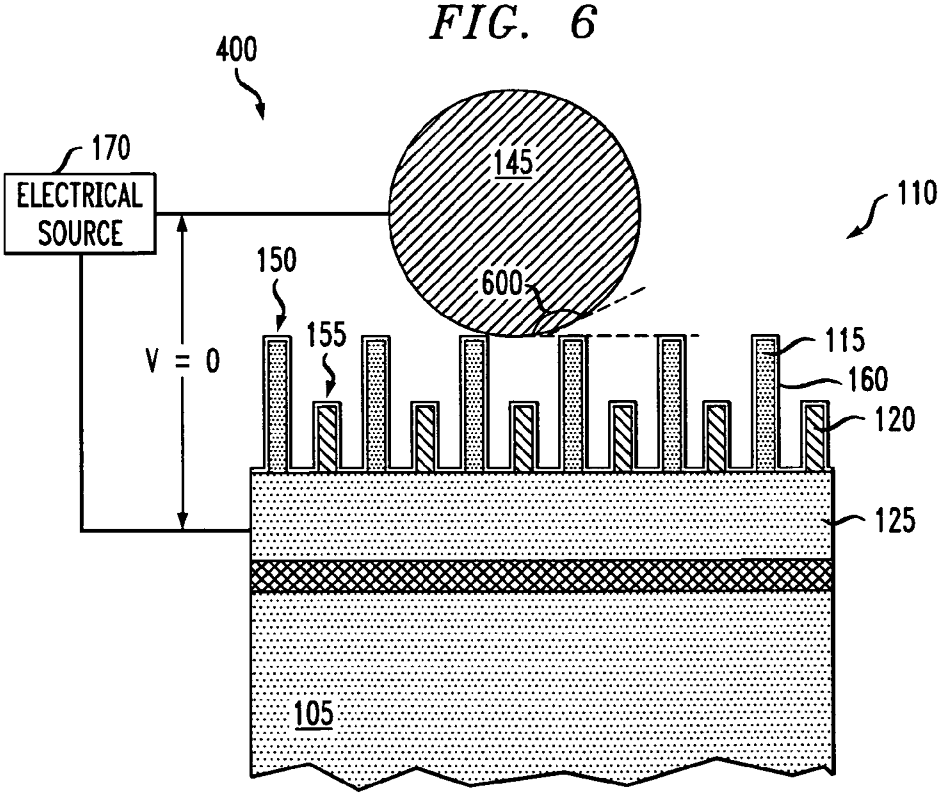

Another embodiment is a method of use. FIGS. 4-6 present cross-section views of an exemplary apparatus 400 at various stages of a method that includes reversibly moving a fluid 145 locatable on a substrate surface 110. The views are analogous to the view presented in FIG. 1, but at a lower magnification. Any of the various embodiments of the present inventions discussed above and illustrated in FIGS. 1-3 could be used in the method. FIGS. 4-6 use the same reference numbers to depict analogous structures shown in FIG. 1.

Turning now to FIG. 4, illustrated is the apparatus 400 after placing the fluid 145 on the surface 110 of a substrate 105. The apparatus 400 can have any of the above-described fluid-support-structures discussed in the context of FIG. 1-3. The surface 110 comprises electrically connected and electrically isolated fluid-support-structures 115, 120, thereon. Each of the fluid-support-structures 115, 120 has at least one dimension of about 1 millimeter or less. The electrically connected fluid-support-structures 115 are taller than the electrically isolated fluid-support-structures 120.

As illustrated in FIG. 4, no voltage is applied between the fluid 145 and the electrically connected fluid-support-structures 115 (e.g., V=0). The electrically connected fluid-support-structures 115 are configured such that the fluid 145 lies on their tops 150 under such conditions. When laying on the tops 150, the fluid 145 preferably touches only the uppermost 10 percent of the electrically connected fluid-support-structures 115, and more preferably, only the tops 150 of these fluid-support-structures 115. Thus, in the absence of an applied voltage, the electrically connected fluid-support-structures 115 provide a non-wettable surface 110. The non-wetted surface 110 can support a droplet of fluid 145 thereon such that the droplet has a contact angle 410 of about 140 degrees or more.

With continuing reference to FIG. 4, FIG. 5 shows the apparatus 400 while applying a non-zero voltage (e.g., V≠0) between the fluid 145 and the electrically connected fluid-support-structures 115. When the voltage is thus applied, the surface 110 of the apparatus 400 becomes wetted. Wetting refers to the fluid's 145 penetration between the electrically connected fluid-support-structures 115. The wetted surface 110 can support a droplet of fluid 145 thereon such that the droplet has a contact angle 500 of about 90 degrees or less.

The electrically isolated fluid-support-structures 120 are configured so that in the presence of the applied non-zero voltage the fluid 145 lies on the tops 155 of these structures. Again, laying on the tops 155 in the context of this step means that the fluid 145 touches only the uppermost 10 percent of the electrically isolated fluid-support-structures 115, and more preferably, only the tops 150 of these fluid-support-structures 115. Preferably the fluid 145 does not contact the base layer 125 that the fluid-support-structures 115, 120 are located on.

While maintaining reference to FIGS. 4-5, FIG. 6 presents the apparatus 400 after removing the voltage (e.g., V=0) thereby causing the fluid 145 to lie on the tops 150 of the electrically connected fluid-support-structures 115. The surface 110 is thereby de-wetted, that is, restored to a non-wettable surface by removing the voltage. For example, in the absence of the applied voltage, the de-wetted surface 110 can once again support a droplet of fluid 145 thereon having a contact angle 600 of about 140 degrees or more. The fluid 145 can thus be reversibly moved between the tops 150 of the electrically isolated fluid-support-structures 120 and the tops 155 of the electrically isolated fluid-support-structures 120.

In some cases, the fluid 145 spontaneously moves back to the tops 150 of the electrically connected fluid-support-structures 115. While not limiting the scope of the embodiment by theory, it is thought that surface tension forces of the fluid 145, in cooperation with the configuration of the fluid-support-structures 115, 120, facilitate spontaneous de-wetting. Thus, the fluid 145 can move back to the tops 150 when the voltage is removed with no additional energy added. In such cases, for instance, no electrical current is passed through the apparatus 400 during de-wetting to heat the fluid 145 or surface 110. Consequently, the temperature of the surface 110, and the fluid 145, remains substantially constant during fluid's reversible movement. In some embodiments of the apparatus 400, for example, the temperature of the surface 110 and the fluid 145 vary by less than about ±5° C. during the fluid's reversible movement as depicted in FIGS. 4-6.

It is advantageous to use the method in situations where it is undesirable to apply energy to cause de-wetting. Applying energy to cause de-wetting is undesirable in cases where prohibitively large amounts of energy would have to be applied to de-wet a large surface area. This can be the case when the fluid-support-structures 115, 120 are on the outer surface 110 of a large apparatus 400 like a boat or torpedo. Applying energy to de-wet is also undesirable if this could heat the substrate 105 or the fluid 145 on the substrate 105. This could happen when the apparatus 400 is a device for analyzing biological fluids 145, such as a lab-on-chip. Still another case where applying energy to de-wet is undesirable is in optical applications, such when the apparatus 400 is a display comprising a plurality of units each having light wells. Applying low or no energy avoids inducing thermal cross-talk between units, for example, due to heating of the substrate 105 or a fluid 145 of the light well, that could otherwise interfere with the proper functioning of the units.

Of course, the apparatus 400 is not precluded from use in applications where energy is added during de-wetting. The use of an apparatus 400 having multilevel fluid-support-structures 115, 120 can advantageously allow the use of reduced amounts of added energy to achieve de-wetting. For instance, the fluid-support-structures 115, 120 can be configured such that the fluid 145 does not spontaneously moves back to the tops 150 when the voltage is removed as described above. Rather, a small amount of energy is still needed to cause de-wetting. Such configurations are advantageous when one wishes to control the reversibility of wetting with a minimal expenditure of energy.

Numerous energy-requiring procedures can be used to facilitate to movement of the fluid 145 from the tops 155 of the electrically isolated fluid-support-structures 120 to the tops 150 of the electrically connected fluid-support-structures 115. For example, the electrical source 170 can be configured to pass a current through the conductive base layer 125, the electrically connected fluid-support-structures 115, or both, resulting in their heating. The movement of fluid using these processes are discussed further detail in above-mentioned U.S. patent application Ser. Nos. 11/227,759 and 11/227,808.

Still another embodiment is a method of manufacturing an apparatus. FIGS. 7-13 present cross-section views of an exemplary apparatus 700 at selected stages of manufacture. The cross-sectional view of the exemplary apparatus 700 is analogous to that shown in FIG. 1. The same reference numbers are used to depict analogous structures shown in FIGS. 1-2. Any of the above-described embodiments of apparatuses can be manufactured by the method.

Figure 7:
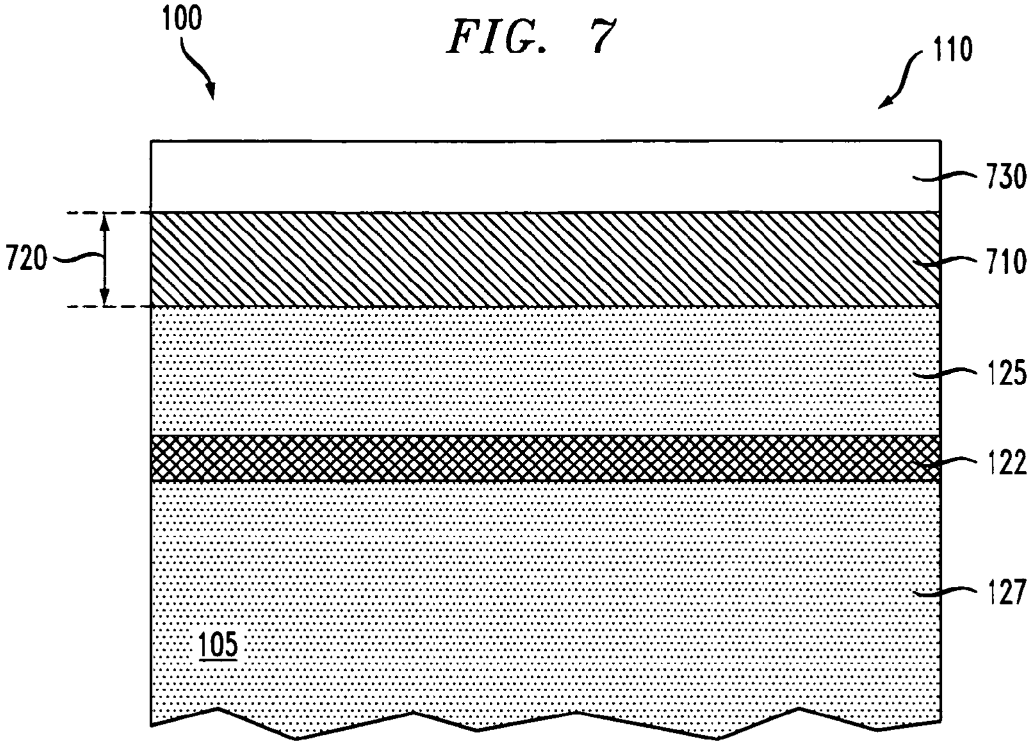
FIGS. 7-13 present cross-sectional views of an exemplary apparatus at selected stages of manufacture.
Figure 8:
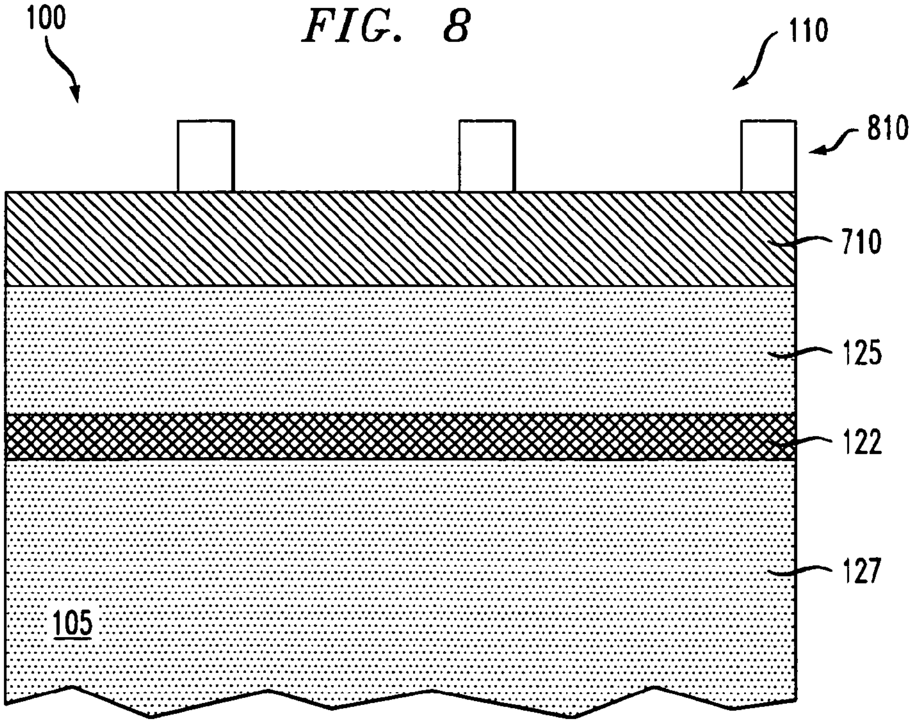
Figure 9:
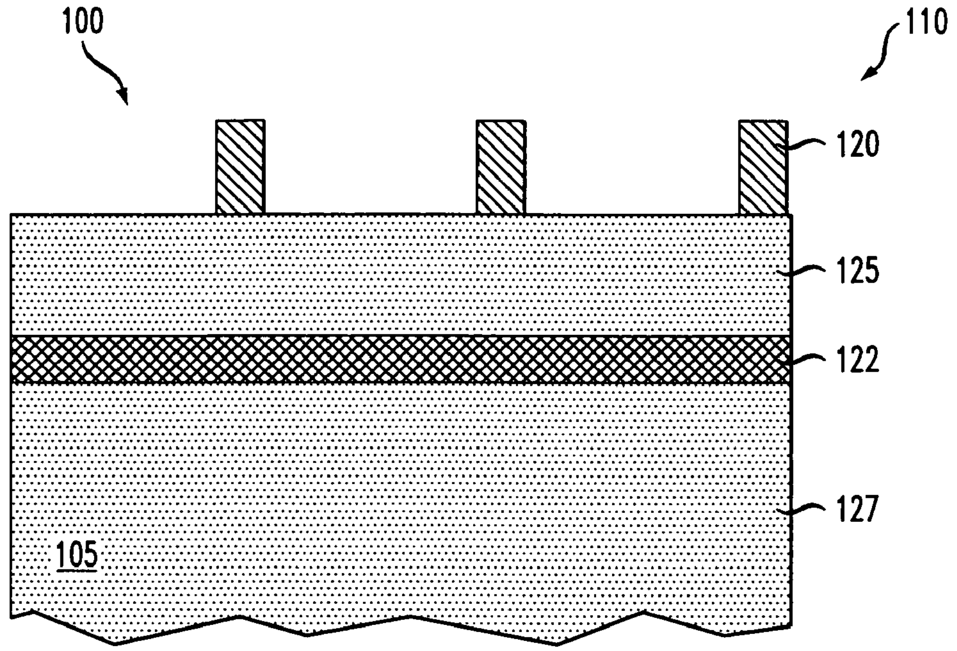

FIGS. 7-9 illustrate selected stages in forming a plurality of electrically isolated fluid-support-structures 120 on a surface 110 of a substrate 105. Turning to FIG. 7, shown is the partially-completed apparatus 700 after providing a substrate 105. Some preferred embodiments of the substrate 110 comprise silicon or silicon-on-insulator (SOI). The SOI substrate 105 depicted in FIG. 7 comprises an insulating layer 122 and upper and lower silicon base layers 125, 127.

FIG. 7 also shows the partially-completed apparatus 700 after forming an electrical insulating layer 710 over the surface 110 of the substrate 105 In some embodiments, the electrical insulating layer 710 is formed by conventional thermal oxidation. In some cases, thermal oxidation comprises heating a silicon substrate 105 to a temperature in the range from about 800 to about 1300° C. in the presence of an oxidizing atmosphere such as oxygen and water. Insulating layers of Si oxide or nitride can be deposited by chemical vapor deposition by decomposing silane or TEOS in oxygen or ammonia atmosphere. One of ordinary skill in the art would be familiar with these methods and their variations. Preferably, the electrical insulating layer 710 has a thickness 720 that is substantially the same as the desired height 135 of the electrically isolated fluid-support-structures (FIG. 1). In other instances the electrical insulating layer 710 is thick enough to electrically isolate the short fluid-support-structures, which can also be a combination of conducting and insulating sections. For instance the thickness 720 can range from about 1 to about 100 microns.

FIG. 7 also shows the partially-completed apparatus 700 after depositing a photoresist layer 730 on a surface 110 of the substrate 150. Any conventional photoresist material designed for use in dry-etch applications and deposition methods may be used to form the photoresist layer 730.

FIG. 8 illustrates the partially-completed apparatus 700 after defining a photoresist pattern 810 in the photoresist layer 730 (FIG. 7). The photoresist pattern 810 comprises the layout of electrically isolated fluid-support-structures for the apparatus 700.

FIG. 9 presents the partially-completed apparatus 700 after forming the electrically isolated fluid-support-structures 120 on the surface 110 of the substrate 150, by removing those portions of the layer 730 that lie outside the pattern using conventional photolithographic procedures and then removing the photoresist pattern 810 (FIG. 8). Portions of the electrical insulating layer 710 that do not define the electrically isolated fluid-support-structures can be removed using conventional dry-etching procedures. Examples include deep reactive ion etching, or other procedures well-known to those skilled in the art.

Figure 10:
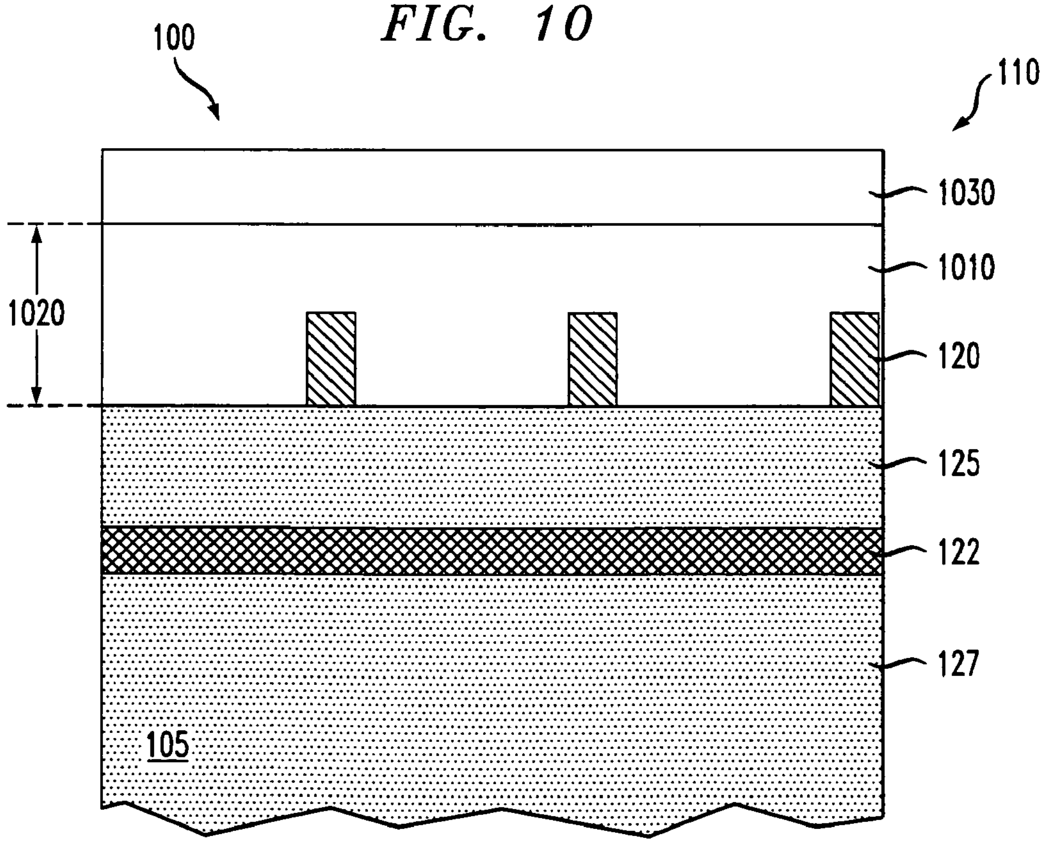
Figure 11:
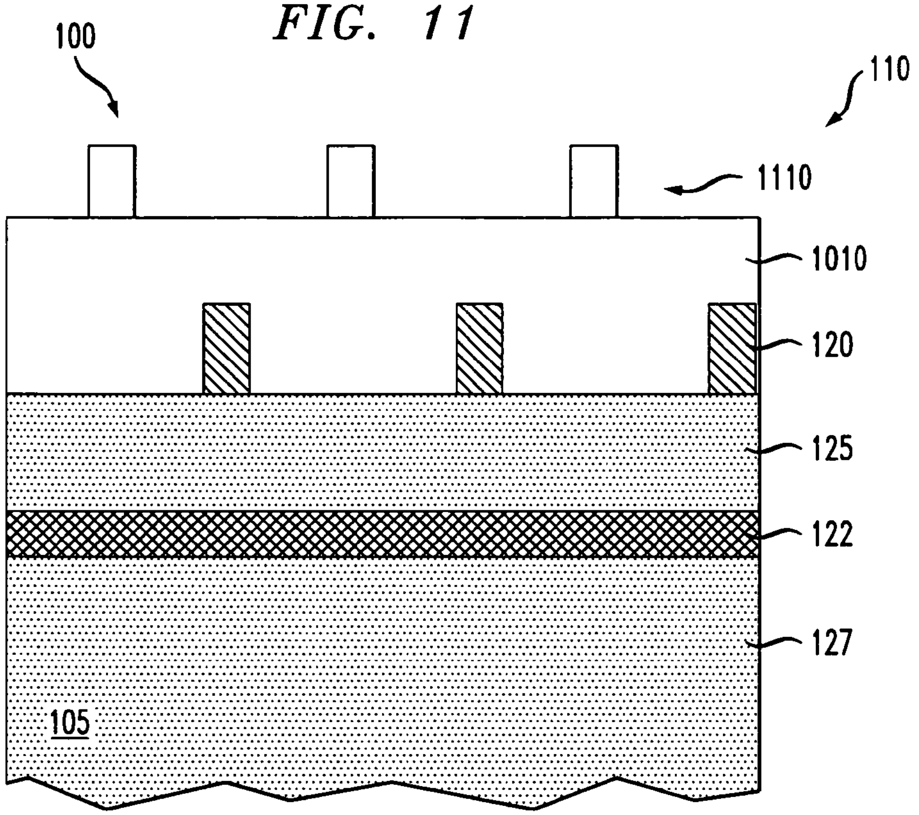
Figure 12:
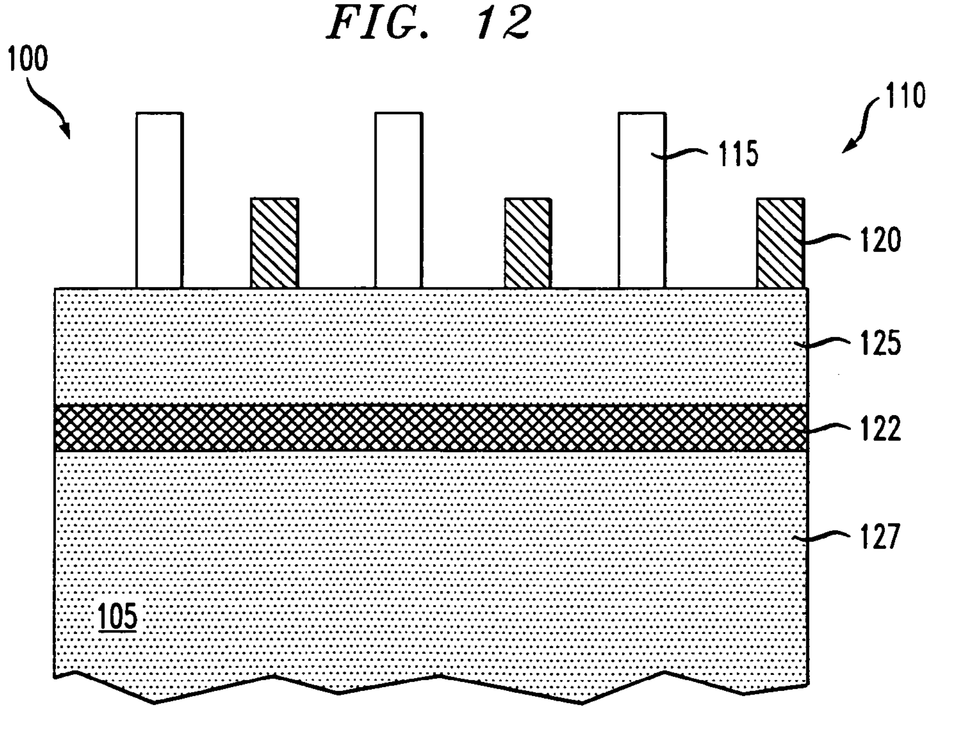

FIGS. 10-12 illustrate selected stages in forming a plurality of electrically connected fluid-support-structures 115 on the surface 110. Turning to FIG. 10, shown is the partially constructed apparatus after forming an electrically conductive layer 1010 over the substrate surface 110. In some embodiments the electrically conductive layer 1010 comprises silicon or doped silicon. In some embodiments, the electrical conductive layer 1010 is formed by depositing polycrystalline silicon by chemical vapor deposition by decomposing silane or dichlorosilane at 700° C. The silicon can be doped using phosphine, arsine or other dopants to change its conductivity. Preferably, the thickness 1020 of the electrical conductive layer 1010 is substantially the same as the desired height 130 of the electrically conductive fluid-support-structures 115 (FIG. 1). FIG. 10 also illustrates the partially-completed apparatus 700 after depositing a second photoresist layer 1030 on the electrically conductive layer 1010.

FIG. 11 illustrates the partially-completed apparatus 700 after defining a second photoresist pattern 1110 in the second photoresist layer 1030 (FIG. 10), by removing those portions of the layer 1030 that lie outside the pattern 1110. The same processes as used to deposit and pattern the photoresist layer 730 (FIGS. 7-8) can be used to deposit and pattern the second photoresist layer 1030. The second photoresist pattern 1110 comprises the layout of electrically connected fluid-support-structures for the apparatus 700.

FIG. 12 presents the partially-completed apparatus 700 after forming the electrically connected fluid-support-structures 115 on the surface 110 of the substrate 150 and removing the photoresist pattern 1110 (FIG. 11). Conventional dry-etching procedures can be used to remove those portions of the electrical conductive layer 1010 that do not define the electrically connected fluid-support-structures 115. Preferably the dry-etching procedure does not remove the electrically isolated fluid-support-structures 120. In some cases the poly-silicon layer is dry etched using the Bosch Process, which uses alternating steps of a Si etch with $SF_6$ and sidewall passivation with $C_4F_8$ to create an anisotropic deep Si etch with straight walls. An example of the Bosch Process is presented in U.S. Pat. No. 5,501,893, which is incorporated by reference herein in its entirety.

Figure 13:
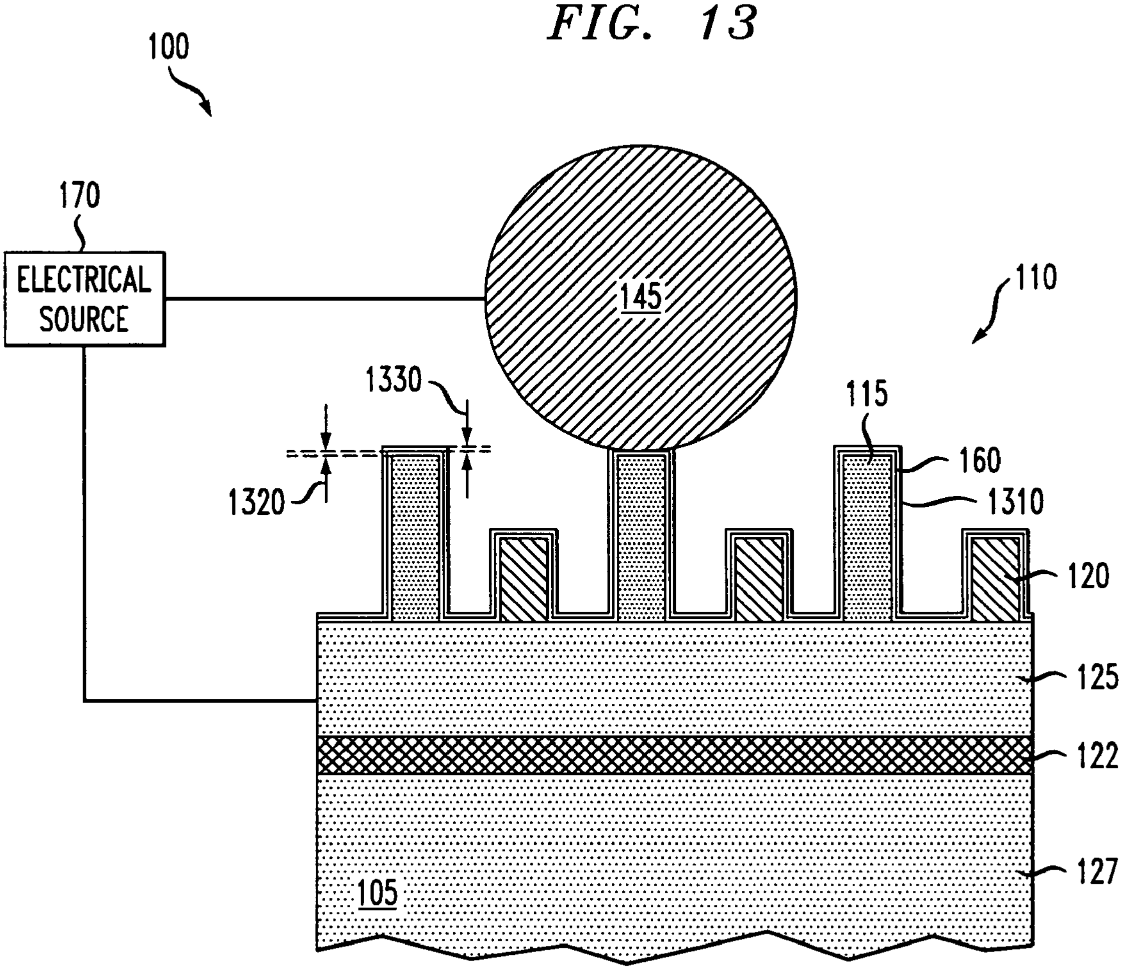

Referring now to FIG. 13, shown is the partially-completed apparatus 700 after forming an electrically insulating coating 160 over the electrically connected fluid-support-structures 115 and after forming a low-surface-energy coating 1310 over the electrically insulating coating 160. The electrically insulating coating 160 can be formed of similar material and using similar methodology as used to form the electrical insulating layer 710 (FIG. 7). In some cases, the electrically insulating coating 160 has a thickness 1320 of about 1 to about 100 nanometers. The low-surface-energy coating 1310 can comprise a fluorinated polymer, such as polytetrafluoroethylene. The low-surface-energy coating 1310 can be spin coated over the surface 110 of the substrate 105. In some cases, the low-surface-energy coating 1310 has a thickness 1330 of about 1 to about 100 nanometers. As noted above, in some cases an electrically insulating and low-surface-energy material can be deposited in a single coat.

As discussed above, each of the completed electrically connected fluid-support-structures 115 and electrically isolated fluid-support-structures 120 has at least one dimension of about 1 millimeter or less. As also discussed above, electrically connected fluid-support-structures 115 are taller than the electrically isolated fluid-support-structures 120.

FIG. 13 also shows the partially-completed apparatus 700 after coupling an electrical source 170 to the base layer 125 of the substrate. The electrical source 170 can comprise any conventional electrical device capable of delivering the appropriate voltage to the base layer 120. As discussed above the electrical source 170 can be configured to apply a voltage between the base layer 125 and a fluid 145 locatable on the surface 110, thereby causing the surface 110 to become wettable.

Although the present invention has been described in detail, those of ordinary skill in the art should understand that they can make various changes, substitutions and alterations herein without departing from the scope of the invention.

What is claimed is:

1. An apparatus comprising:

a substrate having a surface with electrically connected and electrically isolated fluid-support structures thereon, wherein each of said fluid-support-structures have at least one dimension of about 1 millimeter or less, said electrically connected fluid-support-structures are taller than said electrically isolated fluid-support-structures, and a difference between a height of said electrically connected fluid-support-structures and a height of said electrically isolated fluid-support-structures is sufficient to prevent a fluid locatable on said electrically connected fluid-support-structures from contacting said electrically isolated fluid-support-structures.

2. The apparatus of claim 1, wherein a height of said electrically isolated fluid-support-structures is sufficient to prevent a fluid locatable on said electrically isolated fluid-support-structures from contacting a base layer of said substrate.

3. The apparatus of claim 1, wherein a height of said electrically connected fluid-support-structures is at least about 5 microns greater than a height said electrically isolated fluid-support-structures, said height of said electrically isolated fluid-support-structures is at least about 2 microns, and a lateral separation between adjacent ones of said electrically isolated fluid-support-structures is less than about 3 microns.

4. The apparatus of claim 1, wherein a lateral separation between adjacent ones of said electrically connected fluid-support-structures ranges from about 1 to about 20 microns.

5. The apparatus of claim 1, wherein a density of said electrically isolated fluid-support-structures within at least one region of said surface is greater than a density of said electrically connected fluid-support-structures in said region.

6. The apparatus of claim 5, wherein said density of said electrically isolated fluid-support-structures ranges from about 2 to about 10 times greater than said density of said electrically connected fluid-support-structures.

7. The apparatus of claim 1, wherein said electrically isolated fluid-support-structures are interspersed between said electrically connected fluid-support-structures.

8. The apparatus of claim 1, wherein each of said fluid-support-structures comprises a post and said one dimension is a lateral thickness of said post.

9. The apparatus of claim 1, wherein each of said fluid-support-structures comprises a cell and said at least one dimension is a lateral thickness of a wall of said cell.

10. The apparatus of claim 1, further comprising an electrical source that is electrically coupled to said electrically connected fluid-support-structures, said electrical source configured to apply a voltage between said electrically connected fluid-support-structures and a fluid locatable on said surface.

11. A method comprising, reversibly moving a fluid locatable on a substrate surface, comprising:

placing said fluid on said substrate surface, said surface comprising electrically connected and electrically isolated fluid-support-structures thereon, wherein each of said fluid-support-structures have at least one dimension of about 1millimeter or less, said electrically connected fluid-support-structures are taller than said electrically isolated fluid-support-structures, and said fluid lies on tops of said electrically connected fluid-support-structures;

applying a voltage between said fluid and said electrically connected fluid-support-structures thereby causing said fluid to lie on tops of said electrically isolated fluid-support-structures; and removing said voltage thereby causing said fluid to lie on said tops of said electrically connected fluid-support-structures.

12. The method of claim 11, wherein a temperature of said surface remains substantially constant during said moving.

13. A method, comprising:

forming a plurality of electrically isolated fluid-support-structures on a surface of a substrate; and forming a plurality of electrically connected fluid-support-structures on said surface, wherein each of said fluid-support-structures have at least one dimension of about 1 millimeter or less, said electrically connected fluid-support-structures are taller than said electrically isolated fluid-support-structures, and a difference between a height of said electrically connected fluid-support-structures and a height of said electrically isolated fluid-support-structures is sufficient to prevent a fluid locatable on said electrically connected fluid-support-structures from contacting said electrically isolated fluid-support-structures.

14. The method of claim 13, wherein forming said plurality of electrically isolated fluid-support-structures comprises depositing an electrically insulating layer over said surface and patterning said electrically insulating layer.

15. The method of claim 14, wherein said patterning comprises removing portions of said electrically insulating layer that do not define said electrically isolated fluid-support-structures.

16. The method of claim 13, wherein forming said plurality of electrically connected fluid-support-structures comprises forming an electrically conductive layer over said surface and patterning said electrically conductive layer.

17. The method of claim 16, wherein said electrically conductive layer is formed over said electrically isolated fluid-support-structures.

18. The method of claim 16, wherein said patterning comprises removing portions of said electrically conductive layer that do not define said electrically conductive fluid-support-structures.

19. The method of claim 16, further comprising forming an electrically insulating coating over said electrically connected fluid-support-structures.

* * * * *